Figure 5:
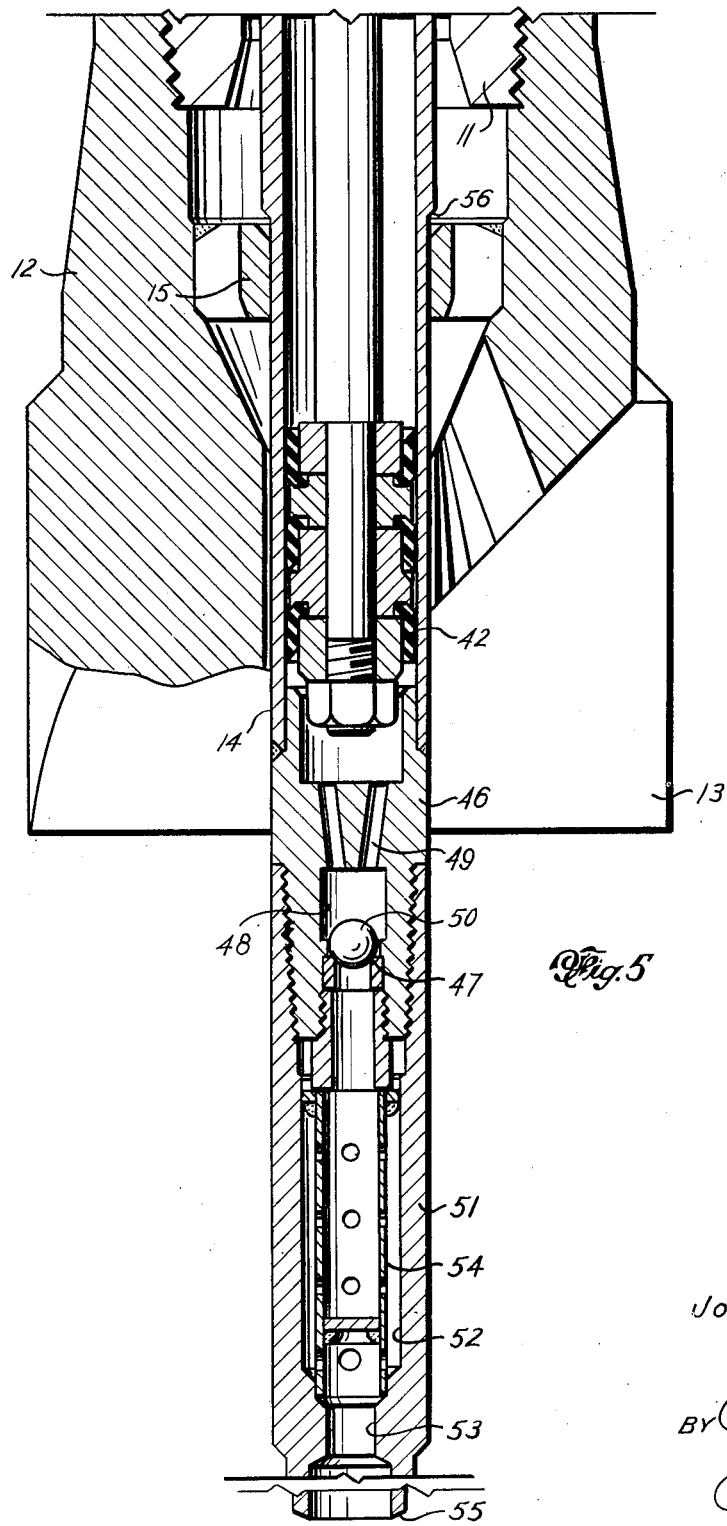

Nov. 7, 1950 J. C. STOKES 2,528,981
FORMATION TESTING APPARATUS
Filed Oct. 15, 1948 4 Sheets-Sheet 1
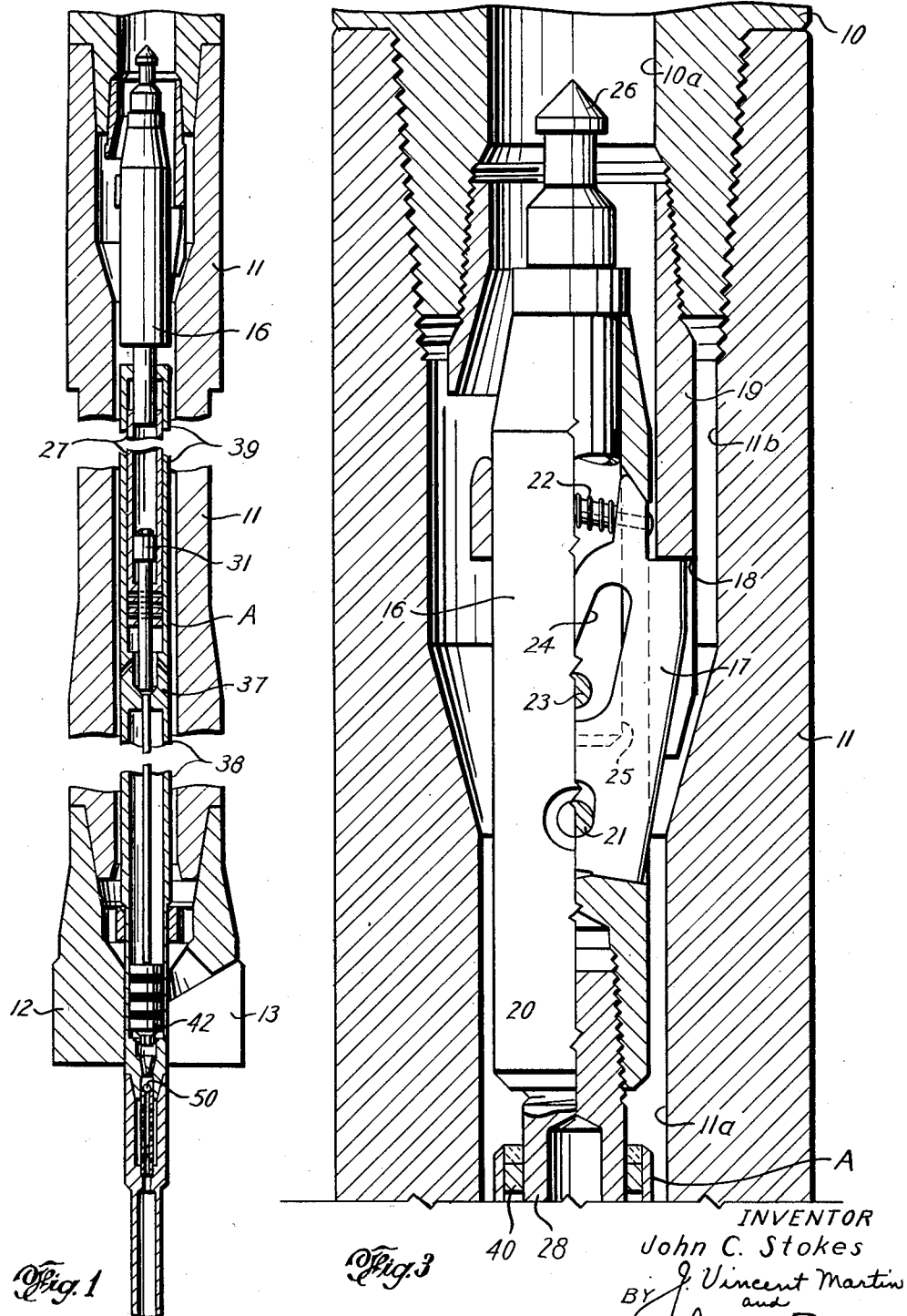
INVENTOR
John C. Stokes
BY J. Vincent Martin
and
Joe E. Edwards
ATTORNEYS

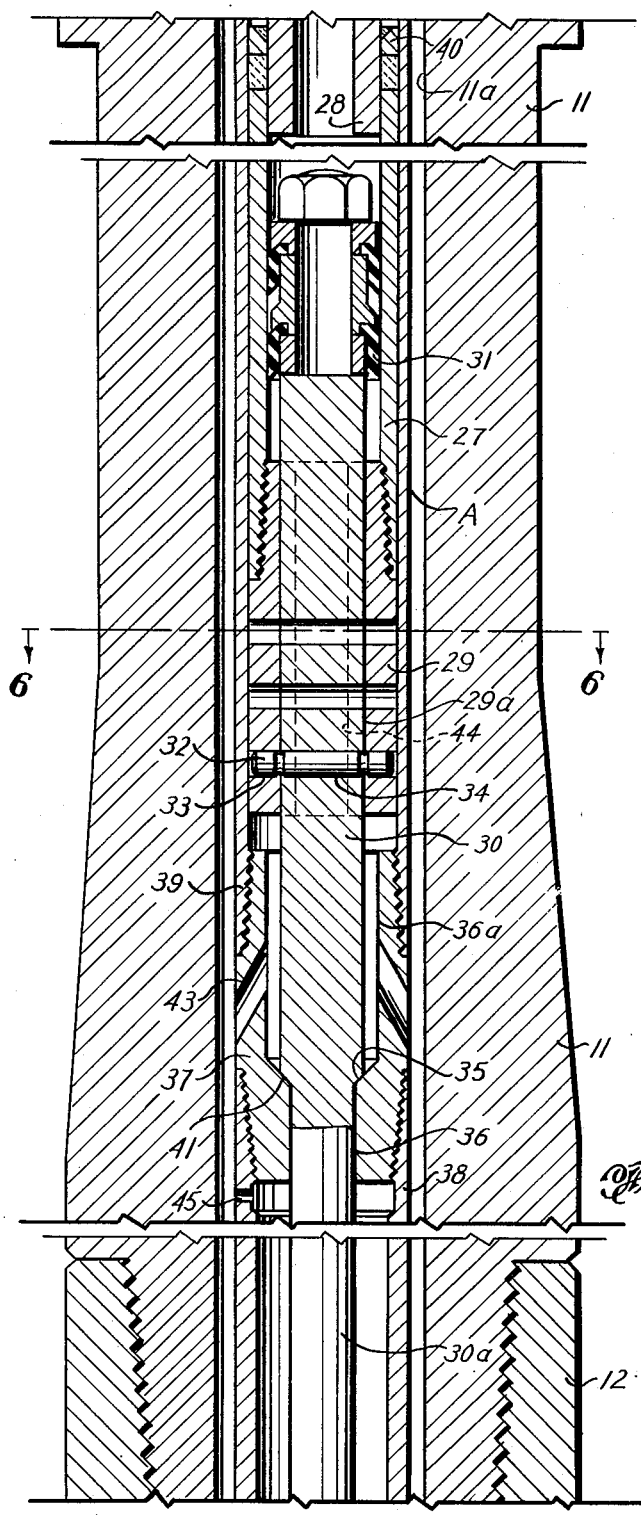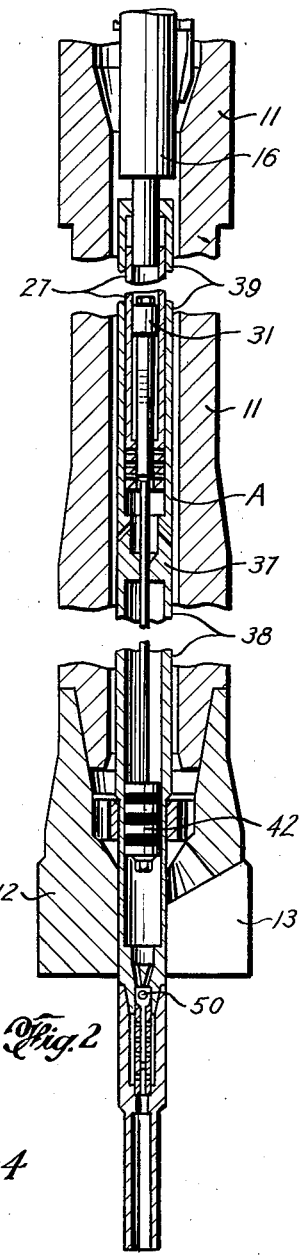

Nov. 7, 1950   J. C. STOKES   2,528,981
FORMATION TESTING APPARATUS
Filed Oct. 15, 1948   4 Sheets-Sheet 3

John C. Stokes
INVENTOR
J. Vincent Martin
and
BY Joe E. Edwards
ATTORNEYS

Nov. 7, 1950 J. C. STOKES 2,528,981
FORMATION TESTING APPARATUS
Filed Oct. 15, 1948 4 Sheets-Sheet 4
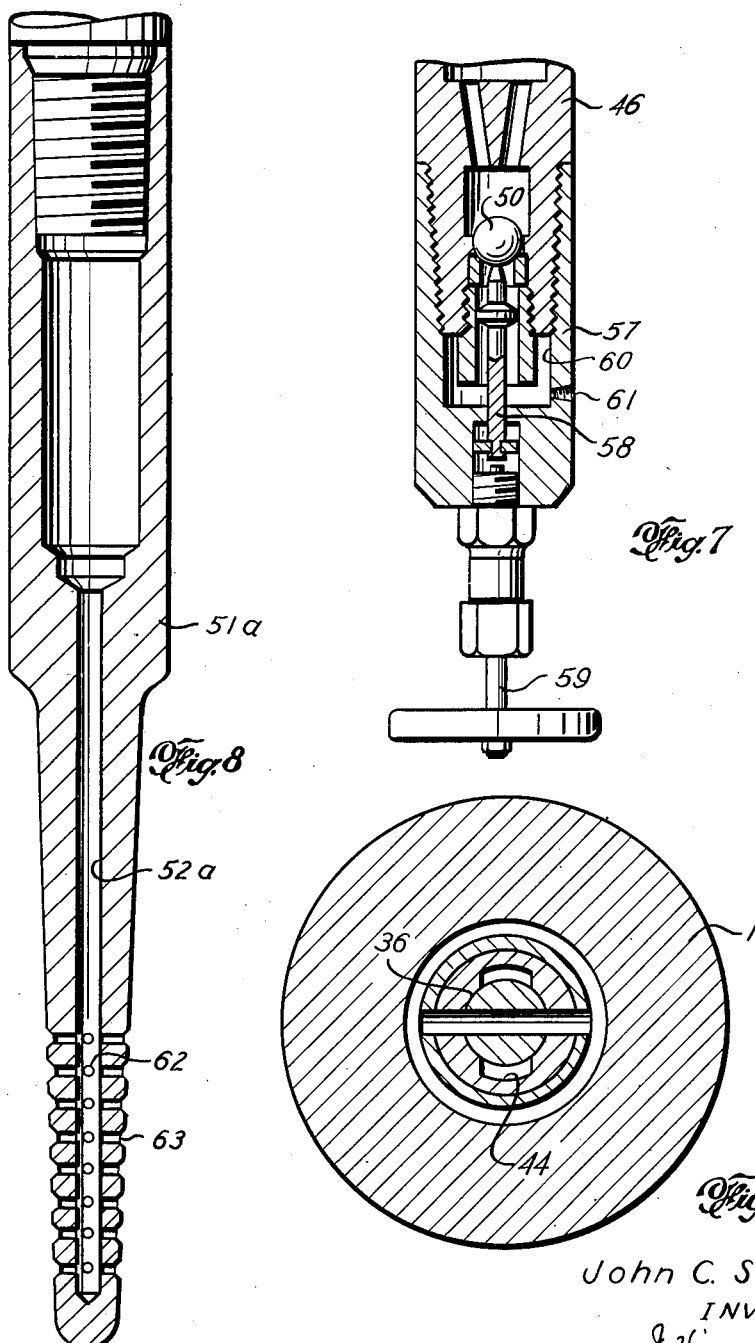
John C. Stokes
INVENTOR
J. Vincent Martin
and
BY Joe E. Edwards
ATTORNEYS Patented Nov. 7, 1950

2,528,981

UNITED STATES PATENT OFFICE 2,528,981

FORMATION TESTING APPARATUS

John C. Stokes, Houston, Tex., assignor to Reed Roller Bit Company, Houston, Tex., a corporation of Texas Application October 15, 1948, Serial No. 54,665

13 Claims. (Cl. 255—1.4)

This invention relates to new and useful improvements in formation testing apparatus.

One object of the invention is to provide an improved apparatus for obtaining fluid or gas samples under natural formation pressure from the stratum or formation at the bottom of the well bore without removing the drill pipe, whereby the samples may be obtained at selected intervals as the drilling progresses.

An important object of the invention is to provide an improved formation testing apparatus which may be lowered, as by pumping, within a drill pipe or stem to a position at which the sample is to be taken and which after the sample is obtained, may be retrieved and brought to the surface by means of a cable or wire line, whereby removal of the drill pipe in order to obtain the sample is not required.

Another object of the invention is to provide an improved formation testing apparatus of the removable type, wherein the hydrostatic pressure of the drilling fluid which is normally present within the well bore, is utilized to actuate a suction means for positively drawing the fluid or gas sample into the sample-receiving chamber, whereby entrance of the sample into said chamber is assured.

A particular object of the invention is to provide an improved formation testing apparatus, of the character described, which is so constructed that the weight of the drill pipe may be employed for urging the tubular probe or entrance tube of the sampler into the formation, a continued subsequent application of drill pipe weight after the probe is in position within the formation functioning to actuate the apparatus to admit the fluid from the formation into the sample-receiving chamber.

Still another object of the invention is to provide an improved formation testing apparatus having a valved chamber for receiving the fluid sample and for maintaining it under its natural pressure until the sample is brought to the surface, together with improved means arranged to co-act with the sample-receiving chamber of the apparatus to permit the pressure of the sample to be accurately measured and to allow recovery of said sample.

A specific object of the invention is to provide an improved formation testing apparatus having an operating piston and a suction piston connected therewith, with the latter arranged, upon actuation, to draw the fluid sample into the sample-receiving chamber and frangible means for normally locking said pistons against movement, whereby the apparatus may be lowered into position in engagement with the formation without danger of operation of said pistons; the frangible locking means being adapted to be fractured by imposing the weight of the drill pipe thereon, after proper engagement of the apparatus with the formation to allow operation of the pistons and obtaining of the desired sample.

A still further object of the invention is to provide an improved sample-taking apparatus which includes an actuating or power piston which is exposed to the hydrostatic pressure of the fluid within the drill pipe, and means for normally locking said piston against movement, said means being arranged to be released by the imposition of a predetermined drill pipe weight thereon, whereby the time of actuation of the piston by the hydrostatic pressure is under the control of the operator at the surface.

The construction designed to carry out the invention will be hereinafter described together with other features of the invention.

The invention will be more readily understood from a reading of the following specification and by reference to the accompanying drawings, wherein an example of the invention is shown, and wherein:

Figure 1 is a schematic drawing of an improved formation testing apparatus, constructed in accordance with the invention, and showing the device within a drill pipe prior to taking of the fluid sample, Figure 2 is a similar view, showing the actuating and suction pistons in a position following taking of the sample, Figure 3 is an enlarged, transverse, sectional view of the upper portion of the apparatus, Figure 4 is a similar view of the intermediate portion of the apparatus, being a continuation of Figure 3, Figure 5 is a view, similar to Figures 3 and 4, of the lower portion of the apparatus, Figure 6 is a horizontal, cross-sectional view taken on the line 6—6 of Figure 4, Figure 7 is a sectional detail of the release valve mechanism, and Figure 8 is a transverse, sectional view of a modified form of probe or entrance tube.

In the drawings, the numeral 10 designates a drill pipe or stem which has an elongated drill collar 11 connected to its lower end by the usual pin and box connection. A drill bit 12 is connected to the lower end of the drill collar and has the usual cutting blades 13. As is usual practice, the bore 10a of the drill pipe communicates with the axial bore 11a of the drill collar whereby the drilling fluid may be circulated downwardly therethrough. The drill bit 12 is formed with an axial bore 14 which is in communication with the bore of the drill collar, and in the upper enlarged portion of the bit, a landing ring 15 is mounted. The particular construction of the bit 12 is subject to variation, it being preferable to employ any of the well known types of core-taking bits now in general use.

The improved formation testing or sample-receiving apparatus, which is generally indicated at A in Figures 1 and 2, comprises a tubular assembly which is arranged to be lowered or pumped downwardly through the bore 10a of the drill pipe and through the bore 11a of the drill collar. The final position of the assembly is illustrated in Figure 1 with the lower end of said assembly projecting through the axial bore 14 of the drill and outwardly in advance of said drill. A latch mechanism 16 is connected to the upper end of the apparatus or assembly and includes a pivoted latching dog 17 which is arranged to engage beneath a shoulder 18 formed by a latching sleeve 19 which is mounted in the lower end of the drill pipe, and which extends into the enlarged upper end 11b of the drill collar. When the latching dog is engaged beneath the shoulder, the assembly A is locked within the bore of the drill collar against upward displacement therein.

The latching dog 17 is mounted within a tubular casing 20 which forms the main housing of the latching mechanism on a pin 21 and said dog is normally urged to its outer or latching position by a spring 22. Retraction of the latching dog is effected by a transversely extending pin 23 which co-acts with an inclined slot 24 provided in the dog. The pin 23 is secured to a longitudinally movable shank 25 which is made integral with a retrieving head 26. It will be apparent that when the retrieving head 26 is moved upwardly, the co-action between the pin 23 and slot 24 will cause an inward movement of the latching dog to its retracted position. Thus, the assembly may be lowered into position and the latching dog will automatically engage beneath the shoulder 18. When the assembly is to be removed, a suitable retrieving tool (not shown) may be lowered on a wire line or cable and engaged with the retrieving head so that an upward pull thereon will retract the dog 17 and will permit removal of said assembly through the drill pipe. It is noted that latch mechanisms similar to the one illustrated are in general use in core-taking equipment, and therefore, the particular details of construction of this mechanism form no part of the present invention.

The apparatus or assembly A includes an upper cylinder 27 which has its upper end welded or otherwise secured to the lower portion of a connecting pin 28, which pin has connection with the lower end of the latching mechanism 16. In this manner, the upper cylinder 27 is directly connected to the latching mechanism. The lower end of the cylinder 27 has a coupling sleeve 29 connected therewith and a piston rod 30 extends through the bore 29a of said sleeve. The upper end of the piston rod carries a suitable piston 31 which is movable within the upper cylinder 27. The piston rod and its connected piston are adapted to be detachably latched against movement by means of one or more shear pins 32 which extend through openings 33 in the sleeve 29 and through a diametrically extending opening 34 in the rod. As is clearly shown in Figure 1, the shear pin or pins 32 function to latch or connect the piston rod 30 to the cylinder 27 with the piston 31 in its lowered position. It is apparent that the piston cannot move upwardly within the cylinder 27 until such time as the shear pin or pins 32 are fractured.

The lower portion of the piston rod is reduced in diameter as indicated at 30a, whereby an external annular shoulder 35 is formed on said rod. The lower reduced portion 30a of said rod is adapted to extend through the bore 36 of a coupling member 37 and said coupling member is threaded into the upper end of a lower cylinder 38. The upper end of the coupling 37 is threaded into the lower end of an outer protective barrel 39 which surrounds the upper cylinder 27 and which has its upper end extending beyond the upper end of said cylinder. A filler ring or collar 40 is secured within the extreme upper end of the protective barrel 39 and surrounds the connecting pin 28. It is noted that the barrel may, under certain conditions, have a limited sliding movement on the pin 28.

The external shoulder 35 which is formed on the piston rod 30 is adapted to engage a beveled seat 41 which is provided within the coupling 37 at the upper end of the bore 36. The reduced portion 30a of the piston rod extends downwardly through the lower cylinder 38 and has a lower piston 42 secured thereto. When the upper piston 31 within the upper cylinder 27 is in its lowered position and is latched in such position by the shear pin or pins 32, the lower piston 42 is at the lower end of its cylinder 38. At this time, the external shoulder 35 on the piston rod 30 is engaging the seat 41 within the bore 36 of the coupling 37.

The under side of the upper piston 31 which will hereinafter be referred to as the operating piston, is exposed to the pressure which is present within the drill pipe and bore of the drill collar through inclined passages 43 which are formed in the wall of the coupling 37. Communication between the passages 43 and the under side of the piston 31 is established through the enlarged upper end 36a of the bore of the coupling and then through vertical channels 44 which are provided in the sleeve 29 through which the shear pin 32 extends. As is clearly shown in Figure 6, the channels 44 establish communication between the area below the sleeve 29 and the lower end of the upper cylinder 27, whereby the pressure may be exerted against the upper piston 31. So long as the shear pins are connecting the member 29 with the piston rod 30, the pressure cannot impart movement to the operating piston 31; however, when the shear pin or pins 32 are fractured, the pressure present within the drill stem may immediately act against the under side of the upper operating piston 31 to move the same upwardly within its cylinder 27. Upward movement of the operating piston 31 will impart an upward movement to the lower piston 42 within its cylinder 38. The rate of travel of the lower piston is controlled by bleed ports 45 which are provided in the upper end of the lower cylinder 38 and which extend radially through the wall thereof. Obviously, by varying the size of the bleed ports 45, the rate of upward movement of the pistons may be controlled.

Connected to the lower end of the lower cylinder 38 is a check valve housing 46 which has a valve seat 47 in its lower end. Above the valve seat the housing is formed with a valve chamber 48 which has communication through passages 49 with the lower end of the cylinder beneath the piston 42. A ball valve 50, which is downwardly seating, is disposed within the housing and is arranged to engage the seat 47. Manifestly, the ball valve 50 will permit upward flow through the passages 49 and into the lower end of the cylinder while preventing a downward flow therefrom.

A tubular probe or entrance tube 51 is connected to the valve housing 46 and extends therebelow. The probe is formed with an axial bore 52 which may be reduced at 53 intermediate its ends, whereby a strainer 54 may be mounted therein. The extreme lower end of the probe may be sharpened as indicated at 55 to facilitate its entrance into the formation. It will be apparent that when the lower piston 42 is moved upwardly, the suction will draw the fluid through the tubular probe 51 and past the ball check valve into the lower cylinder 38. Thus, the lower cylinder forms the fluid receiving chamber for obtaining the fluid sample. As the cylinder is filled with the sample, the ball check 50 will seat and trap the sample therein, so that it may be retained under formation pressure. In operation, the apparatus A is assembled with the pistons 31 and 42 at the lower ends of their respective cylinders, being latched in such position by means of the shear pin or pins 32. The apparatus is lowered or pumped downwardly through the bore 10a of the drill pipe 10 and enters and passes downwardly through the bore 11a of the drill collar. An external shoulder 56, which is formed on the lower cylinder 38, is arranged to engage the landing ring 15 to limit the downward movement of the assembly, and in such position, the tubular probe 51 extends in a plane below the drill bit 12. At this time, the latching dog 17 of the latching mechanism 16 is arranged to engage beneath the latching shoulder 18 in the upper portion of the drill collar.

With the apparatus or assembly latched in position within the drill collar, a downward weight may be imposed upon the drill pipe and this weight will be transmitted through the latching mechanism, then through the upper cylinder 27, shear pin or pins 32, piston rod 30 and through the shoulder 35 on said piston rod to the coupling 37 and lower cylinder 38. From the lower cylinder, the imposed weight is transferred directly to the tubular probe 51, whereby said probe may be forced downwardly into the formation in the bottom of the bore. It will be apparent that by varying the number of shear pins 32 as well as the strength thereof, any desired weight may be imposed before the connection between the piston rod and upper cylinder is broken, and thus, the probe may be forced into any type of formation. The harder the formation, the more shear pins would be employed.

After the probe has been forced into the formation from which a sample is to be obtained, a continued imposition of weight will result in shearing of the pin or pins 32, whereby the piston rod 30 is disconnected from the sleeve 29 and cylinder 27. As soon as the shear pin is fractured, the hydrostatic pressure present within the drill stem which is constantly acting upon the under side of the upper operating piston 31, may immediately move said piston upwardly within the cylinder 27. As has been explained, this pressure is conducted to the under side of the operating piston through the passages 43, bore 36a of the coupling 37, and then through the vertical channels or passageways 44 which extend through the sleeve 29. As soon as the upper operating piston 31 is moved upwardly within the upper cylinder 27, the lower piston 42 is pulled upwardly within the lower cylinder 38. The rate of movement of the lower piston 42 is controlled by the size of the bleeder ports 45 in the upper end of the lower cylinder.

As the lower piston moves upwardly within its cylinder, it creates a suction which draws the fluid or gas sample upwardly from the formation through the tubular probe, past the strainer 54 and past the ball check valve 50, which has been pulled to its raised position. The sample under the formation pressure is thus drawn into the lower cylinder 38, which, as has been pointed out, forms a fluid receiving chamber. The operating piston 31 will be moved to its upper limit of travel, and at this time the lower cylinder 38 will be filled with the fluid sample drawn in through the tubular probe. As soon as movement of the lower piston 42 is halted, the pressure within the lower cylinder, which is the natural formation pressure of the sample, will cause the check valve 50 to seat and thereby trap or retain the sample within the lower cylinder.

The apparatus is then removed from the drill collar by lowering a suitable retrieving tool (not shown) on a wire line or cable and engaging the same with the retrieving head 26 of the latch mechanism 16. An upward pull on the head will result in a retraction of the latching dog 17, whereby the entire assembly may be retrieved and brought to the surface without removal of the drill pipe. Upon reaching the surface, it may be desirable to determine the pressure of the fluid which is retained within the lower cylinder 38 and for this purpose the valve mechanism shown in Figure 7 is employed.

The releasing valve comprises a valve housing 57 which is arranged to thread onto the lower end of the check valve housing 46 in place of the tubular probe 51. Thus, when the apparatus is brought to the surface, the probe 51 is disconnected from the housing 46 and the releasing valve 57 is threaded thereon. The releasing valve includes an actuating stem or rod 58 which is movable upwardly by means of a hand actuated operating stem 59. When moved upwardly, the operating rod 58 will engage the ball valve 50 and unseat the same, whereby the fluid from within the lower cylinder 38 may flow downwardly past the ball valve and into a chamber 60 in the housing 57. A port 61 extends from the chamber 60 and may have a suitable pressure gauge (not shown) connected therein. In this manner, the pressure which is the natural pressure of the fluid sample, may be readily observed when the apparatus is retrieved and brought to the surface. For emptying the sample from the lower cylinder, a suitable line may be connected with the port 61 in place of the pressure gauge and may flow the fluid sample to a suitable container.

It is noted that various types of tubular probes 51 may be employed, and in Figure 8 a modified type of probe 51a is illustrated. In this form, the lower portion of the probe is gradually tapered or reduced and the entrance of fluid into the bore 52a of said probe is through a plurality of reduced ports or openings 62 which extend radially through the lower portion of said probe. Annular grooves 63 may be provided in the probe with the inlet openings 62 communicating with said grooves. In this form of probe, the lower portion is driven into the formation and the annular grooves provide flow passages, whereby the fluid may readily flow through the inlet openings 62 and then upwardly through the bore of said probe.

From the foregoing, it will be apparent that the testing apparatus is readily run into and removed from the drill collar without the necessity of removing the entire drill stem. Thus, a fluid sample may be obtained at any selected time as the drilling progresses. The apparatus is lowered or pumped downwardly through the drill stem and is retrieved by means of a wire line or cable. When lowered and latched in position, the weight of the drill pipe may be utilized to force the probe or entrance tube into the formation a sufficient distance to assure a seal around the probe, whereby a true sample may be obtained. When the shear pins are fractured to permit actuation of the operating piston, said piston is immediately moved to its upper position by means of the hydrostatic pressure which is present within the drill stem. This is a positive means for assuring operation of the upper piston, and since said upper piston is directly connected through the piston rod with the lower piston, a sufficient suction is created to draw the fluid sample into the fluid receiving chamber which is formed by the lower cylinder 36. After actuation of the pistons, the fluid sample is trapped by means of the check valve arrangement so that the sample is brought to the surface under the natural formation pressure. The releasing valve 57 makes it possible to accurately determine the pressure of the sample and to withdraw said sample from the cylinder whenever desired.

The foregoing description of the invention is explanatory thereof and various changes in the size, shape and materials, as well as in the details of the illustrated construction may be made, within the scope of the appended claims, without departing from the spirit of the invention.

Having described the invention, I claim:

1. A formation testing apparatus including, a tubular assembly adapted to be removably latched within a drill pipe, said assembly comprising, a fluid sample receiving chamber, suction means within the chamber for drawing the fluid sample into said chamber, and operating means exposed to and actuated by the hydrostatic pressure within the drill pipe for operating the suction means, and locking means engageable with the operating means for locking the same against actuation, said locking means being selectively releasable by manipulation of the drill pipe.

2. A formation testing apparatus including, a tubular assembly adapted to be removably latched within a drill pipe, said assembly comprising, a fluid sample receiving chamber, suction means within the chamber for drawing the fluid sample into said chamber, pressure-responsive operating means connected with the suction means and actuated by the pressure within the drill pipe for operating the suction means, and locking means for locking the pressure-responsive means against actuation, said locking means being releasable by manipulation of the drill pipe.

3. A formation testing apparatus including, a tubular assembly adapted to be removably latched within a drill pipe, said assembly comprising, a fluid sample receiving chamber, suction means within the chamber for drawing the fluid sample into said chamber, pressure-responsive operating means connected with the suction means and actuated by the pressure within the drill pipe for operating the suction means, and frangible means associated with the pressure-responsive means for locking the latter against actuation, said frangible means being releasable by the imposition of a predetermined weight of the drill pipe thereon.

4. A formation testing apparatus including, a tubular assembly adapted to be removably latched within a drill pipe, said assembly comprising, a fluid sample receiving chamber, suction means within the chamber for drawing the fluid sample into said chamber, pressure-responsive operating means constantly exposed to the pressure which is present within the drill pipe and connected with the suction means and frangible locking means for locking the pressure-responsive means against actuation, said frangible means being adapted to be fractured to release the pressure-responsive means for actuation upon the imposition of a predetermined weight of the drill pipe thereon.

5. A formation testing apparatus including, a tubular assembly, means for removably latching said assembly within a drill pipe, whereby the weight of the drill pipe may be imposed on the assembly, said assembly comprising, a fluid sample receiving chamber in its lower portion, a tubular probe member extending downwardly from and communicating with the fluid receiving chamber, said probe being forced into the formation when the assembly is latched within the drill pipe by the imposition of the weight of the drill pipe thereon, suction means within the fluid receiving chamber for drawing the fluid sample into the chamber through said probe, and means for utilizing the pressure within the drill pipe for actuating said suction means.

6. A formation testing apparatus including, a tubular assembly, means for removably latching said assembly within a drill pipe, whereby the weight of the drill pipe may be imposed on the assembly, said assembly comprising, a fluid sample receiving chamber in its lower portion, a tubular probe member extending downwardly from and communicating with the fluid receiving chamber, said probe being forced into the formation when the assembly is latched within the drill pipe by the imposition of the weight of the drill pipe thereon, suction means within the fluid receiving chamber for drawing the fluid sample into the chamber through said probe, and pressure-responsive means connected with the suction means and actuated by the hydrostatic pressure within the drill pipe for operating the suction means.

7. A formation testing apparatus including, a tubular assembly, means for removably latching said assembly within a drill pipe, whereby the weight of the drill pipe may be imposed on the assembly, said assembly comprising, a fluid sample receiving chamber in its lower portion, a tubular probe member extending downwardly from and communicating with the fluid receiving chamber, said probe being forced into the formation when the assembly is latched within the drill pipe by the imposition of the weight of the drill pipe thereon, suction means within the fluid receiving chamber for drawing the fluid sample into the chamber through said probe, pressure-responsive means connected with the suction means and actuated by the hydrostatic pressure within the drill pipe for operating the suction means, and locking means for locking the pressure-responsive means against actuation, said locking means being releasable at a selected time by manipulation of the drill pipe.

8. A formation testing apparatus including, a tubular assembly, means for removably latching said assembly within a drill pipe, whereby the weight of the drill pipe may be imposed on the assembly, said assembly comprising, a fluid sample receiving chamber in its lower portion, a tubular probe member extending downwardly from and communicating with the fluid receiving chamber, said probe being forced into the formation when the assembly is latched within the drill pipe by the imposition of the weight of the drill pipe thereon, suction means within the fluid receiving chamber for drawing the fluid sample into the chamber through said probe, pressure-responsive means connected with the suction means and actuated by the hydrostatic pressure within the drill pipe for operating the suction means, and frangible means associated with the pressure-responsive means for locking the latter against actuation, said frangible means being releasable by the imposition of a predetermined weight of the drill pipe thereon, with the amount of weight required to release the frangible means being greater than the weight necessary to force the probe into the formation, whereby said probe is in position within the formation before said frangible means is released.

9. A formation testing apparatus as set forth in claim 5, together with a back check valve mounted in the inlet end of the fluid receiving chamber for retaining the sample therein.

10. A formation testing apparatus as set forth in claim 5, together with a back check valve mounted in the inlet end of the fluid receiving chamber for retaining the sample therein, and a releasing valve mechanism adapted to be substituted for the tubular probe when the assembly is retrieved for opening said back check valve to permit a determination of the pressure of the sample and to allow recovery of said sample.

11. A formation testing apparatus as set forth in claim 5, wherein the fluid receiving chamber is a cylinder and the suction means is a piston.

12. A formation testing apparatus adapted to be removably latched within a drill pipe including, a lower fluid sample receiving cylinder, a suction piston movable in said cylinder for drawing a fluid sample therein, an upper operating cylinder axially aligned with the sample receiving cylinder, an operating piston within said cylinder and constantly exposed to the hydrostatic pressure within the drill pipe, means for connecting the operating piston to the suction piston, and means releasable by the imposition of the weight of the drill pipe thereon for locking the operating piston against operation until the fluid sample is to be taken.

13. A formation testing apparatus adapted to be removably latched within a drill pipe including, a lower fluid sample receiving cylinder, a suction piston movable in said cylinder for drawing a fluid sample therein, an upper operating cylinder axially aligned with the sample receiving cylinder, an operating piston within said cylinder and constantly exposed to the hydrostatic pressure within the drill pipe, means for connecting the operating piston to the suction piston, an entrance tube on the lower end of the receiving cylinder and in communication therewith, frangible means connecting the operating piston to the upper cylinder to lock said operating piston against operation, and means for transmitting the weight of the drill pipe downwardly through the upper cylinder and frangible means to the lower cylinder and tube to force said tube into the formation at the bottom of the well, subsequent and increased imposition of weight on the frangible means fracturing the same and permitting actuation of the operating piston and its connected suction piston.

JOHN C. STOKES.

REFERENCES CITED

The following references are of record in the file of this patent:

UNITED STATES PATENTS

| Number | Name | Date |
| --- | --- | --- |
| 1,753,066 | Poole et al. | Apr. 1, 1930 |
| 2,096,783 | Callaway et al. | Oct. 26, 1937 |
| 2,176,240 | Bandy | Oct. 17, 1939 |
| 2,316,216 | Bandy | Apr. 13, 1943 |
| 2,418,500 | Chambers | Apr. 8, 1947 |